United States Patent [19]
Coonce et al.

[11] Patent Number: 6,039,319
[45] Date of Patent: Mar. 21, 2000

[54] HYGIENIC FITTING WITH THERMAL EXPANSION AREA FOR GASKET

[75] Inventors: Richard L. Coonce, Seven Hills; Aaron Safula Sharghi, Stow; Douglas Alan Slife, Hudson, all of Ohio

[73] Assignee: Swagelok Company, Solon, Ohio

[21] Appl. No.: 09/026,206

[22] Filed: Feb. 19, 1998

Related U.S. Application Data

[60] Provisional application No. 60/038,993, Feb. 24, 1997, and provisional application No. 60/075,081, Feb. 18, 1998.

[51] Int. Cl.[7] ..................................................... F16L 23/22
[52] U.S. Cl. ........................... 277/314; 277/614; 277/318
[58] Field of Search ............................... 285/349, 93, 350, 285/336, 337, 363, 364; D23/269; 277/314, 318, 602, 608, 614, 616, 626

[56] References Cited

U.S. PATENT DOCUMENTS

| | | |
|---|---|---|
| Re. 34,144 | 12/1992 | Leigh . |
| 442,947 | 12/1890 | Bowers . |
| 1,137,113 | 4/1915 | Bouchard . |
| 1,873,855 | 8/1932 | Wilson . |
| 2,070,291 | 2/1937 | McHugh . |
| 2,291,709 | 8/1942 | Goetze . |
| 2,342,422 | 2/1944 | Morehead et al. . |
| 2,417,025 | 3/1947 | Volpin . |
| 2,552,750 | 5/1951 | Thornhill . |
| 2,780,483 | 2/1957 | Kessler . |

(List continued on next page.)

FOREIGN PATENT DOCUMENTS

| | | |
|---|---|---|
| 707239 | 4/1965 | Canada . |
| 195-868-A1 | 10/1986 | European Pat. Off. . |
| 0327714A2 | 8/1989 | European Pat. Off. . |
| 0645 573 A2 | 3/1995 | European Pat. Off. . |
| 1.583.060 | 10/1969 | France . |
| 499 090 | 5/1930 | Germany . |
| 731 042 | 12/1942 | Germany . |
| 947 034 | 8/1956 | Germany . |
| 1962745 U | 6/1967 | Germany . |
| 3542523 | 7/1987 | Germany . |
| 3741-782 | 6/1989 | Germany . |
| 38-05-885 | 9/1989 | Germany . |
| 41-05-206-A1 | 8/1992 | Germany . |
| 4140814 | 6/1993 | Germany . |
| 4201535 | 7/1993 | Germany . |
| 7-158783 | 6/1995 | Japan . |
| 280783 | 12/1964 | Netherlands . |
| 674764 | 7/1990 | Switzerland . |
| 1316 | 2/1901 | United Kingdom ................... 285/243 |
| 798650 | 7/1958 | United Kingdom . |
| WO 89/03495 | 4/1989 | WIPO . |

OTHER PUBLICATIONS

Newman Product Literature, May 1997.
Cajon Product Literature, May 1996.
Triclover Literature, 1995.

*Primary Examiner*—Lynne H. Browne
*Assistant Examiner*—Greg Binda
*Attorney, Agent, or Firm*—Calfee, Halter & Griswold LLP

[57] ABSTRACT

A sealing gasket for insertion into a circumferentially continuous groove of a flange joint for joining axially aligned tube ends, the flange joint being of the type having axially opposed flanges at the tube ends to form a groove there between when the joint is assembled, the groove being formed by axially opposed seal faces and radial end faces of the flanges, the groove comprising a groove first portion that is open to an interior flow passage of the tubes and a groove second portion that extends radially outward from the groove first portion, the gasket having a gasket first portion that seals the groove first portion and a gasket second portion that extends from the gasket first portion and into the groove second portion; the gasket second portion being axially compressed when the joint is assembled and engaging with the radial end faces to produce a radial compression of the gasket; the gasket second portion having a volume that is less than volume of the groove second portion to form an expansion space in the groove second portion when the joint is assembled.

34 Claims, 5 Drawing Sheets

U.S. PATENT DOCUMENTS

| | | |
|---|---|---|
| 2,789,844 | 4/1957 | Kessler . |
| 3,078,110 | 2/1963 | Starr . |
| 3,100,656 | 8/1963 | MacArthur . |
| 3,124,366 | 3/1964 | Hillman ................................ 277/614 X |
| 3,180,650 | 4/1965 | Liebig . |
| 3,189,371 | 6/1965 | Swan . |
| 3,195,906 | 7/1965 | Moyers . |
| 3,201,725 | 8/1965 | Johnson . |
| 3,215,442 | 11/1965 | Papenguth . |
| 3,298,719 | 1/1967 | Bills et al. . |
| 3,302,953 | 2/1967 | Glasgow . |
| 3,387,867 | 6/1968 | Rogers . |
| 3,618,989 | 11/1971 | Ito . |
| 3,669,474 | 6/1972 | Bode . |
| 3,727,926 | 4/1973 | Berry . |
| 3,747,963 | 7/1973 | Shivak . |
| 3,775,832 | 12/1973 | Werra . |
| 3,819,211 | 6/1974 | Knox . |
| 3,820,830 | 6/1974 | Dryer . |
| 3,873,102 | 3/1975 | Lotze et al. . |
| 3,989,285 | 11/1976 | Yancey . |
| 4,063,758 | 12/1977 | Westberg ............................. 285/336 X |
| 4,094,520 | 6/1978 | Ng et al. . |
| 4,288,105 | 9/1981 | Press ..................................... 285/93 X |
| 4,362,327 | 12/1982 | Mieth . |
| 4,429,847 | 2/1984 | Jablonski et al. . |
| 4,627,646 | 12/1986 | Kessel . |
| 4,653,725 | 3/1987 | Nanz et al. . |
| 4,735,445 | 4/1988 | Maier . |
| 4,779,903 | 10/1988 | Maier et al. . |
| 4,836,583 | 6/1989 | Maier et al. . |
| 4,872,712 | 10/1989 | Maier . |
| 5,076,617 | 12/1991 | Bronnert . |
| 5,090,871 | 2/1992 | Story et al. . |
| 5,196,814 | 3/1993 | Felker et al. . |
| 5,222,747 | 6/1993 | McGarvey . |
| 5,251,941 | 10/1993 | McGarvey . |
| 5,316,320 | 5/1994 | Breaker . |
| 5,433,454 | 7/1995 | Ramberg . |
| 5,505,464 | 4/1996 | McGarvey . |
| 5,566,983 | 10/1996 | Gluys et al. . |
| 5,947,533 | 9/1999 | Fisher . |

HYGIENIC FITTING WITH THERMAL EXPANSION AREA FOR GASKET

PRIORITY CLAIM

This application claims the benefit of the following provisional applications entitled "IMPROVED HYGIENIC FITTING WITH THERMAL EXPANSION AREA FOR GASKET": Ser. No. 60/038,993 filed Feb. 24, 1991 and Ser. No. 60/075,081 filed on Feb. 18, 1998, the entire disclosures of which are fully incorporated herein by reference.

BACKGROUND OF THE INVENTION

The subject invention is directed toward the art of pipe or tube joints and couplings and, more particularly, to a flange-type tube joint incorporating an improved relationship between the face seal and an associated gasket.

Flange-type tube joints have soft material gaskets, e.g. elastomeric, plastic, etc. that are clamped between opposed flange end faces for sealing purposes. These tube joints are frequently used in hygienic processing systems where fluid retention is highly undesirable. These systems are usually constructed with small angle slopes on the order of 2° on tubing runs and employ gravity drains. Therefore, due to the small angle slope, it is necessary to limit the potential for fluid retention by concentrating on regions where fluid retention may occur. For example, it is known to design the gasket and associated flanges such that when the joint is completed, the radially inner face of the gasket forms a substantially flush or smooth continuation between the interior surfaces of the connected tubes. Joints of this general type are shown, for example, in U.S. Pat. Nos. 3,775,832, 4,735,445, and German Patentschrifts CH 674764 A5 and 947,034.

The prior art has proposed various methods or designs to assure that over or under compression of the gasket cannot occur. In spite of this, it has been found that both situations can occur resulting in a variety of process problems that are significant and often unrecognized. When gaskets are over compressed the gasket material is extruded into the flow path of the pipe or tubing system. This can happen during initial makeup of the fitting or following a period of elevated process temperatures, such as a steam sterilization cycle, when thermal expansion of the gasket will result in excessive extrusion. Excessive extrusion causes several primary problems including flow restriction, cell shear, system contamination and fluid retention. Flow restriction can occur, for example, from having the inner periphery of the gasket extend excessively into the flow path thus creating an orifice effect. Hygienic systems are validated by the FDA for specific cleaning procedures including minimum flow rates needed to create the turbulent flow conditions required to effect the cleaning process. A gasket in a restrictive flow condition can cause the system to not meet the required fluid velocities and consequently not meet government regulations. A second problem, cell shear, is caused by delicate micro-organisms impacting on the extruded gasket resulting in the destruction of the cell which is the target product of the bioprocess. A third problem, system contamination, can result when over time of exposure to process conditions, especially steam, an extruded gasket can become brittle and break off pieces that cause system contamination. A fourth problem, fluid retention, occurs when draining the system to recover the product. The extruded gaskets result in retention of substantial amounts of process fluid in the system. This is a significant problem in systems requiring a high degree of cleanliness and/or ease of flushing and changeover between process fluids.

In the case of under compression two primary problems occur, fluid entrapment and leakage. Under compression can occur from improper assembly or as a result of thermal cycles. As a gasket extrudes under temperature, as discussed above, when cooled back to normal or ambient process temperatures, it will not return to its original position in conventional hygienic fittings. When this condition occurs there is less compressive force on the remaining gasket material within the fitting which can cause the fitting to loosen. In some cases only a single thermal cycle can result in a loss of the seal at the bore line which allows process fluid to enter the seal area and become entrapped. The isolated fluid cannot be cleaned without disassembly and can cause contamination of the same or subsequent batches. In some cases, process fluid reaches atmosphere and leakage occurs.

SUMMARY OF THE INVENTION

The subject invention provides a tube joint construction of the type discussed above that is designed to eliminate or greatly reduce gasket extrusion, reduce flow restriction, reduce contamination, reduce fluid retention, and provide improved alignment during assembly.

In particular, and in accordance with various aspects of the subject invention, a tube joint assembly of the general type discussed includes a pair of cylindrical tube ends in axially aligned contiguous relationship. Each tube end has a cylindrical interior surface of the same diameter in aligned relationship with the cylindrical interior surface of the opposed tube end. Connecting flanges extend radially outward of each tube end with axially opposed faces defining a circumferentially continuous packing groove including a first axially narrow portion defined by axially opposed sealing faces. The first axially narrow portion opens to the cylindrical interior surfaces. A second axially wider portion of the groove is located radially outward of the first portion and has a radial outer face radially overlying and aligned with the first axially narrow portion. A soft material gasket is positioned in the packing groove. A preferred gasket configuration has a narrow portion or rib that is sized and dimensioned to completely fill the first axially narrow portion of the packing groove and engage the axially opposed sealing faces with substantial sealing pressure.

An integral second portion or crown of the gasket is sized and dimensioned to extend into the second portion of the packing groove. The second portion has an inner radial dimension that forms an interference fit with the tube ends for ease of assembly and sufficient mass to hold the tube ends in a desired aligned relation during makeup of the joint. These structural features thus contribute to improved alignment of the components in the assembled fluid system for ease of assembly.

The second portion of the gasket also has a radial dimension sufficient to extend radially across the second portion of the packing groove and into compressive engagement with the radial outer face thereof when the joint is completed. The axial extent of the packing groove is sufficiently large to provide expansion space into which the gasket can expand when subjected to temperature increases. Provision of the expansion space thereby reduces radially inward extrusion of the gasket beyond the cylindrical interior surfaces of the tube ends.

Preferably, and in accordance with a more limited aspect of the invention rigid means are defined by surface portions carried on the opposed faces of the connecting flanges to prevent movement of the flanges toward one another beyond a predetermined minimum point.

The invention as described above results from a finding that materials used for such gaskets undergo an extrusion either as a result of initial makeup of the coupling or as a result of increased temperature. By providing expansion space at a location disposed radially outward of the narrow inner sealing portion of the gasket, there results a significant reduction of gasket expansion into the flow path of the tube ends. The narrow inner sealing portion of the gasket is radially loaded because the second portion of the gasket is sized to extend radially across the second portion of the packing groove into compressive engagement with the radial outer face of the second portion of the packing groove. Moreover, the compressive engagement forms a secondary seal radially outward of the primary seal.

Additionally, the engagement between the gasket second portion and the radial outer face of the packing groove provides a radial compression, or hoop strength, that permits the expansion of the gasket into the expansion space while holding the gasket from undesired radial shifting of the narrow inner sealing portion from its desired location adjacent the flow path.

As can be seen from the foregoing, a primary object of the invention is the provision of a fitting and gasket assembly wherein extrusion of the gasket into the fluid flow path is substantially reduced and a smooth continuation of the inner wall surfaces of the connected tubes is maintained thereby reducing fluid retention, flow restriction and system contamination.

Still another object of the invention resides in the improved alignment of the components of the joint assembly.

Yet another object is the provision of a pipe or tube joint assembly that provides a secondary seal.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments and a method of which will be described in detail in this specification and illustrated in the accompanying drawings which form a part hereof, and wherein.

DETAILED DESCRIPTION OF THE PREFERRED EMBODIMENT

Figure 1:
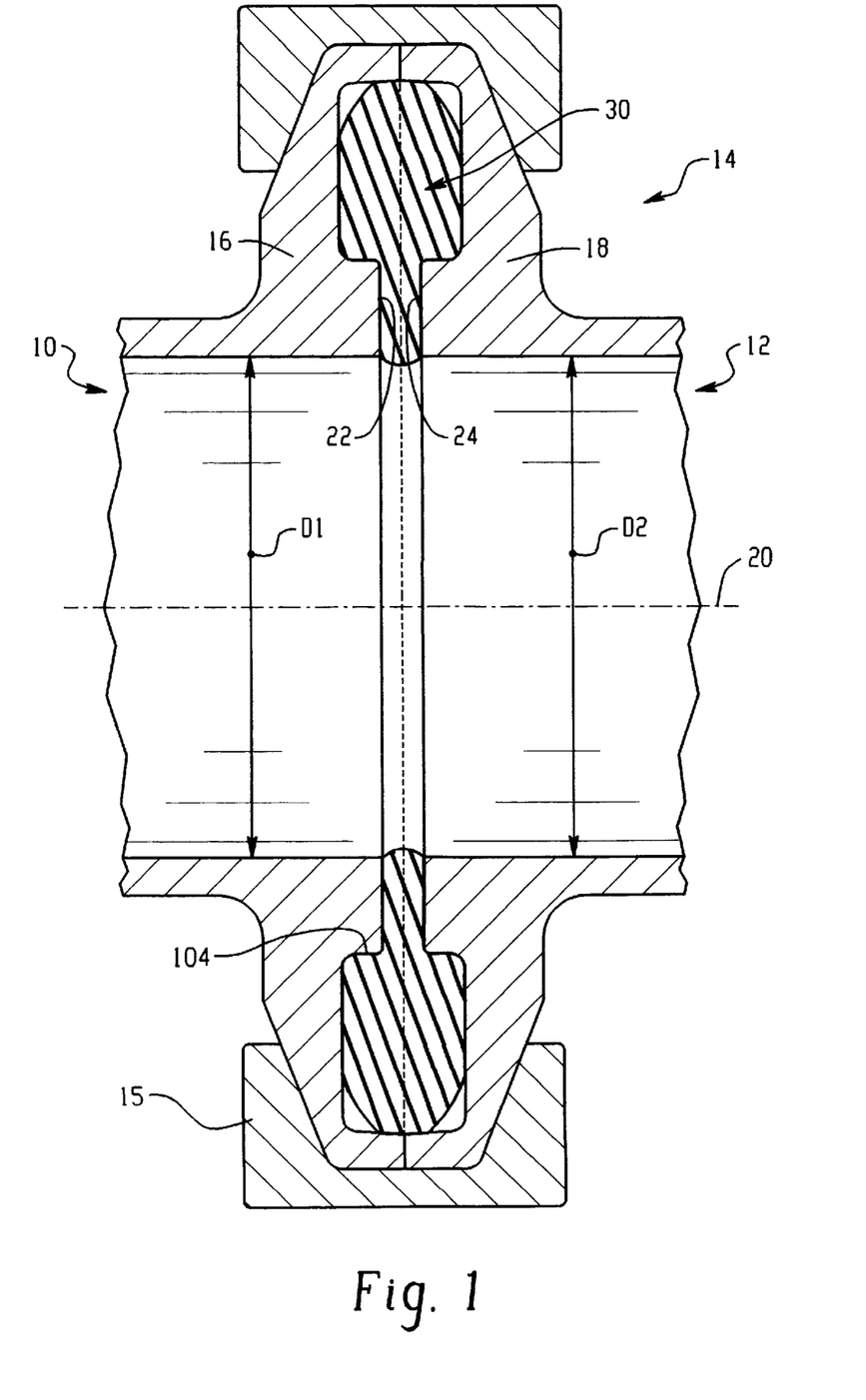
FIG. 1 is a transverse cross-sectional view through a preferred form of pipe or tube joint construction formed in accordance with the subject invention.

Referring now to the drawings wherein the showings are for the purposes of illustrating preferred embodiments of the invention only and not for purposes of limiting same, FIG. 1 shows a pair of axially aligned, cylindrical pipe or tube ends 10, 12 which are joined in sealed relationship by a flange-type joint assembly 14. The tube ends 10, 12 have uniform inner open diameters D1 and D2, respectively, which are of the same diameter and positioned in closely aligned relationship. Circumferentially continuous, radially extending flanges 16, 18, respectively, are formed at the ends of each of the tube ends 10, 12. The flanges allow the tube ends to be clamped in the assembled condition shown by a conventional clamp ring 15 which is only schematically illustrated in the drawing. Although the flanges 16, 18 could be formed as separate elements and suitably connected to the tube ends, they are shown in the subject embodiment as being integrally formed on the respective tube ends 10, 12.

Each of the flanges 16, 18 includes a sealing end face that preferably lies in a plane perpendicular to the center axis 20. End faces 22, 24 of the flanges 16, 18, respectively, cooperate to define a circumferentially continuous packing receiving recess or groove 30. In the subject embodiment, the packing receiving groove 30 is arranged so that when the flanges 16, 18 are clamped into the relationship shown in FIG. 1, the groove 30 has a radial inner first portion 32 (see FIG. 2) which is relatively narrow and opens toward the interior of the central flow passage. The groove 30 further includes a second axially wider portion 34 that is located radially outward of the first portion 32 and is circumferentially continuous thereabout. The control of the width of the packing groove 30 is provided by rigid extensions 16a, 18a on the radial outer edge of the flanges 16, 18, respectively, to limit movement of the flanges axially toward one another.

Positioned within the groove 30 is a gasket 38 formed from a suitable soft material that will form an effective seal when compressed between the flanges. Many different gasket materials could be used including ethylene propylenes, fluorocarbons, silicone rubbers, nitrites, neoprenes, polyethylene and tetrafluoroethylenes. In this embodiment, the gasket 38 has a preferred cross-section as shown in FIG. 3. As will be described hereinafter, the shape of the gasket 38 can have different configurations and appearances while still achieving the benefits and advantages of the invention. A radially inner portion 40 of the gasket defines a rib that has a substantially constant axial dimension that, in an uncompressed state, is slightly greater than the axial dimension of the radially inner portion of the groove (see the superimposed representation of FIG. 4). When assembled, the radial inner portion is compressed between the faces 22, 24 to form a first or primary seal that fills the void defined by the inner, narrow portion of the groove. Moreover, in the illustrated embodiment of FIG. 4 the inner radial diameter of the gasket in an uncompressed state is slightly greater than the diameter of the flow path. Thus when the joint is fully assembled, the inner diameter of the gasket is displaced into a substantially flush relation with the diameter of the flow path creating a bore line seal that reduces fluid retention and prevents fluid entrapment, even at elevated system process temperatures. In other embodiments, however, the uncompressed rib 40 can have a diameter that is less than, greater than or equal to the diameter of the flow path, depending on the associated fitting configuration, to produce after make-up a flush or substantially flush bore line seal. In some embodiments it will be desirable to permit a small extrusion of the gasket rib 40 into the flow path after make-up, as illustrated in an exaggerated manner in FIG. 2. In such cases, especially for hygienic applications, it will be desired that the rib portion that extends into the flow path be convex to reduce fluid entrapment. The present invention can be used with such a configuration because the invention provides features that reduce further extrusion at elevated system process temperatures, as will be described hereinafter.

The radially outer portion 42 of the gasket has an enlarged axial and radial dimension relative to the rib 40 that forms, in the embodiment of FIG. 3, a mushroomshaped cap or crown 42 that extends integrally from the gasket inner portion 40. Again, with reference to FIG. 4, the axial dimension of the cap (at its widest portion) in an uncompressed state is larger than the axial dimension of the groove in the completed joint. In this manner, the gasket is compressed into sealing contact with radial faces of the enlarged portion of the groove (see FIGS. 1 and 2). The compression resulting from these dimensional relationships also displaces the gasket material radially outward so that it engages the radial outer wall of the groove at the rigid extensions 16a, 18a. This engagement forms a secondary seal that can significantly increase the rated pressure of the assembly. Furthermore, the secondary seal presents a barrier to atmosphere outside the hygienic fitting. For example, the secondary seal serves to make the hygienic fitting splash proof.

The engagement also has the additional advantage of causing hoop stress (i.e. increasing hoop strength) that prevents the rib of the gasket from moving radially outward in response to pressure in the fluid system. Prior art arrangements that use axial compression and include a gap between the outer radial edge of the gasket and the groove wall (here defined by the rigid extensions) are potentially subject in some applications to radial shifting of the gasket in response to pressure in the fluid line. The entire gasket in such prior designs is thus susceptible to radial shifting resulting in the loss of an effective bore line seal and the attendant problems of fluid retention, contamination, etc. In the present invention, the radial engagement between the rigid extensions 16a, 18a and the second portion of the gasket 42 thus inhibits this undesirable action while providing a secondary seal or barrier.

The rounded tapering outer radial region of the cap 42 with the inner portion 40 provides the distinctive mushroom shape to the gasket. The smooth transition and reduction in the axial dimension of the gasket as it extends radially outward from the tube bore provides for expansion spaces 44, 46. The second axially wider portion 34 of the groove 30 is dimensioned to accommodate anticipated expansion of the gasket in response to elevated temperatures and is not intended to be completely filled by the gasket at ambient temperature. Thus, even though the gasket engages the rigid extensions to form the secondary seal as described above, the spaces 44, 46 are defined between the groove wall and the reduced or tapering region of the gasket.

The enlarged mass of the cap 42 provided by the preferred configuration also has the advantage of improving alignment of the joint components, even while still allowing for an expansion space and the radial compression. That is, since the gasket is dimensioned to form an interference fit with the groove at the interface of the first and second portions of the groove, the gasket will remain in place on a first flange while the opposing flange is positioned for initial make-up of the joint assembly, and the opposing tubes are held in temporary alignment while the joint assembly is completed. The enlarged mass of the gasket also provides a positive alignment reference in the nature of a "fit" that is tactilely sensed as the flanges are brought together about the gasket and helps keep the flanges and tubes in alignment during the make-up procedure. This allows the user to complete the joint assembly without adjusting the alignment of the tube ends. Likewise, the tubing alignment is improved since the initial makeup of the tubes is more accurate and maintained through assembly of the joint.

Figure 4:
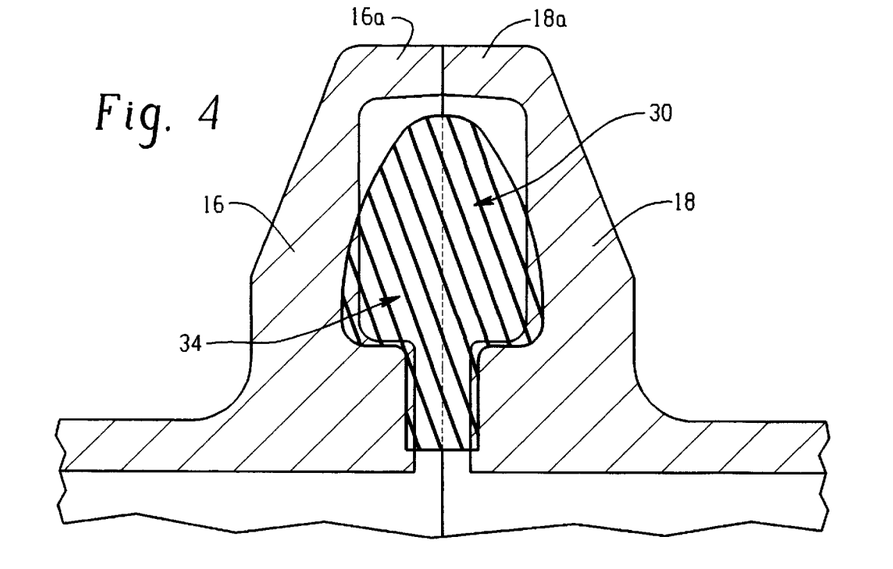
FIG. 4 is a cross-sectional view of the gasket in its uncompressed form overlaid on the gasket recess to provide a better understanding of the relative relationships involved.
Figure 5:
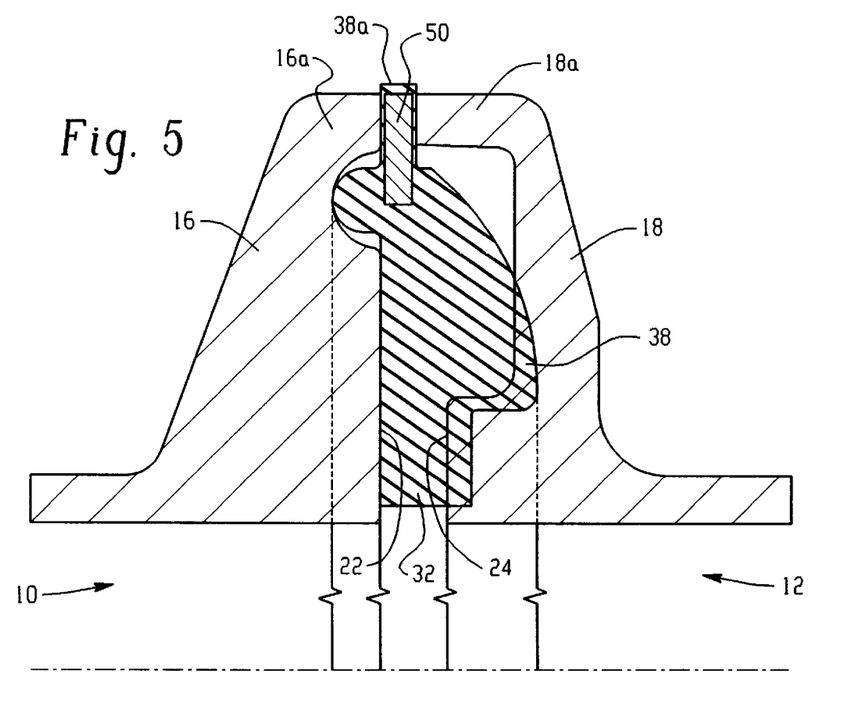
FIG. 5 is a cross-sectional view of another preferred embodiment of the invention.

As illustrated in FIG. 5, another preferred embodiment of the gasket incorporating the features of the invention is illustrated. Particularly, it is evident that the gasket need not be symmetrically formed about a radial axis. Here, the right-hand face of the gasket has the generally mushroom-shape of the gasket described in connection with the embodiment of FIGS. 1–4. However, the outer radial portion of the gasket is not intended to engage the rigid extensions and form a secondary seal since an annular metal ring 50 is employed for receipt between the rigid extensions. The engagement between the metal ring 50 and the faces of the rigid extensions limits the axial compression that can be imposed on the gasket. The other features of the present invention such as (i) forming an effective bore line seal and (ii) forming an expansion space upon makeup of the joint for elevated temperature conditions, are still provided. The opposite face, or left-hand face, of the gasket is a conventional configuration and thus does not incorporate all of the features of the invention. It does illustrate, though, that the gasket can adopt a number of different configurations without departing from the overall scope and intent of the invention. Thus, the assembly 38, 50 is in the form of an adapter device that permits two different flange configurations to be joined while at the same time maintaining an effective bore line seal and expansion area.

As illustrated in FIG. 5, a thin layer 38a of the gasket 38 material encapsulates the metal ring 50. This can be accomplished, for example, during a molding process for the gasket 38. The entire ring need not be encapsulated.

Figure 6:
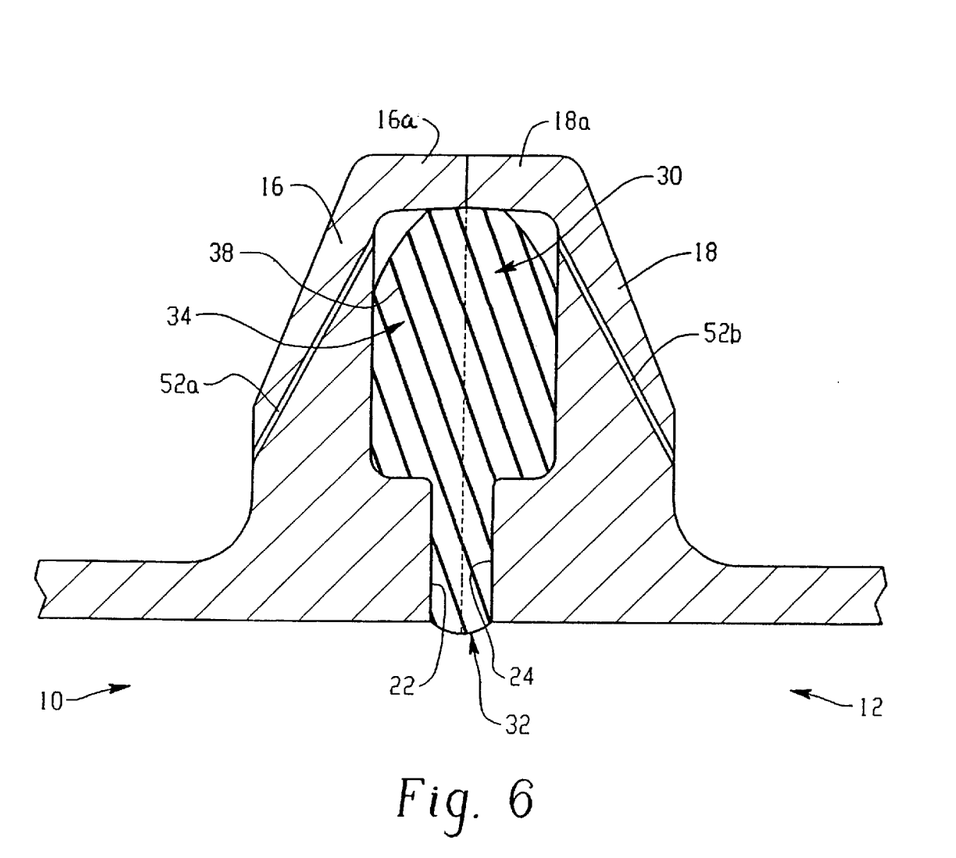
FIG. 6 illustrates the addition of ports in the joint assembly for sensing or monitoring the integrity of the bore line seal and potential contamination.
Figure 7A:
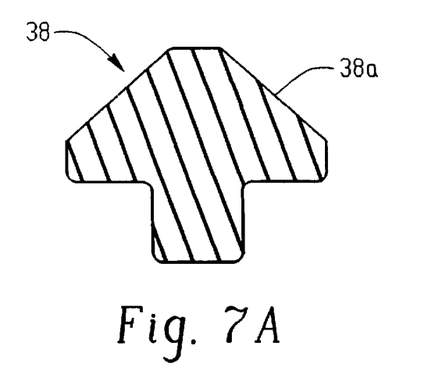
FIGS. 7A–7E illustrate alternative exemplary configurations and shapes for a gasket in accordance with the invention.
Figure 7B:
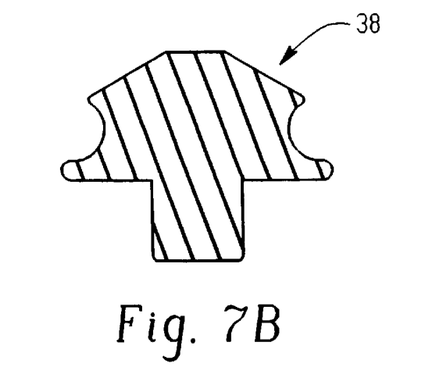
Figure 7C:
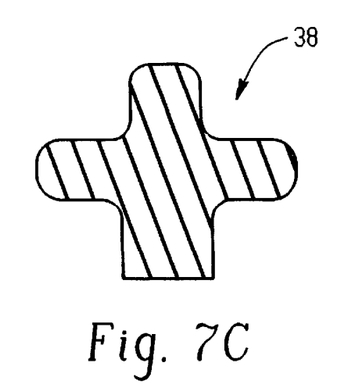
Figure 7D:
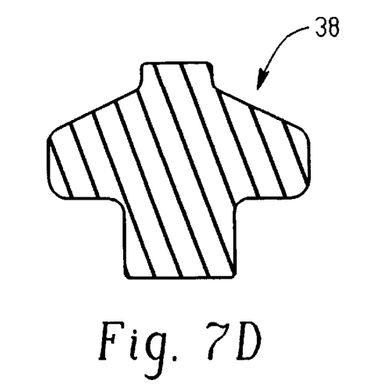
Figure 7E:
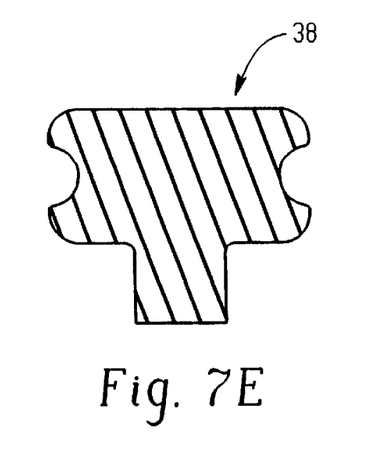

FIG. 6 is another modification of the invention that incorporates sensing or monitoring capabilities to the joint assembly. Particularly, when a secondary seal is formed by the cap or second portion of the gasket, the flanges may be modified to include capillary ports 52a, 52b that communicate with the expansion spaces 44, 46. Suitable sensors (not shown) will communicate with the ports and provide an indication of the integrity of the bore line seal. This provides the system operator with the ability to accurately monitor the integrity of the primary seal through the expansion spaces 44, 46 while the secondary seal still contains the system pressure if a bore line seal fails. Moreover, the monitoring arrangement can be incorporated on both sides of the gasket or used on just one side if a modified form of gasket (for example as shown in FIG. 5) is used.

Figure 2:
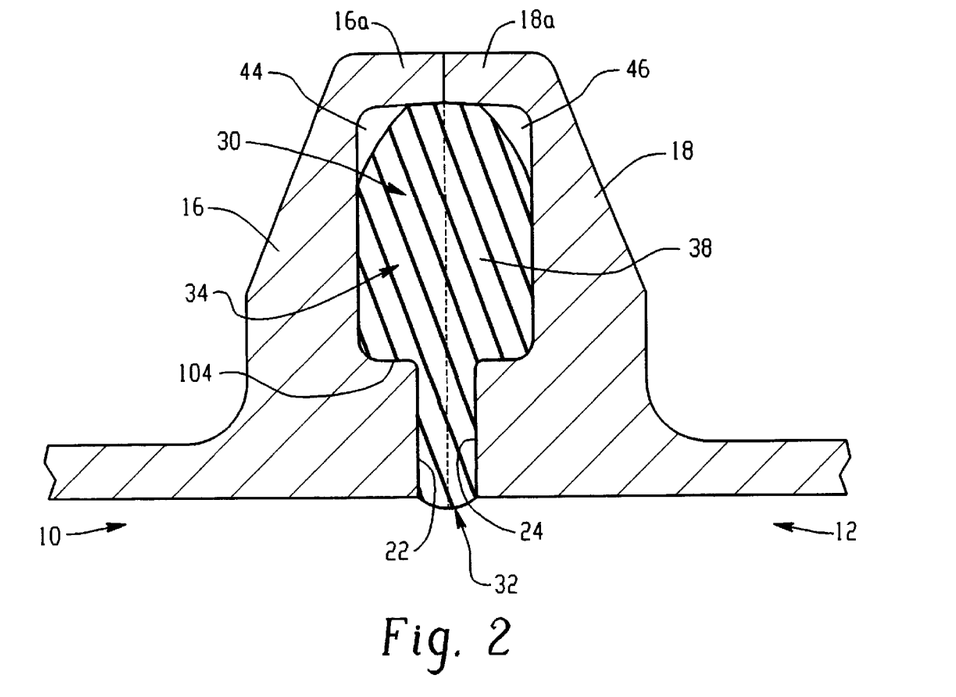
FIG. 2 is a greatly enlarged view of the gasket recess of the made-up joint of FIG. 1 to more fully show the relationships between the gasket and the gasket recess.
Figure 3:
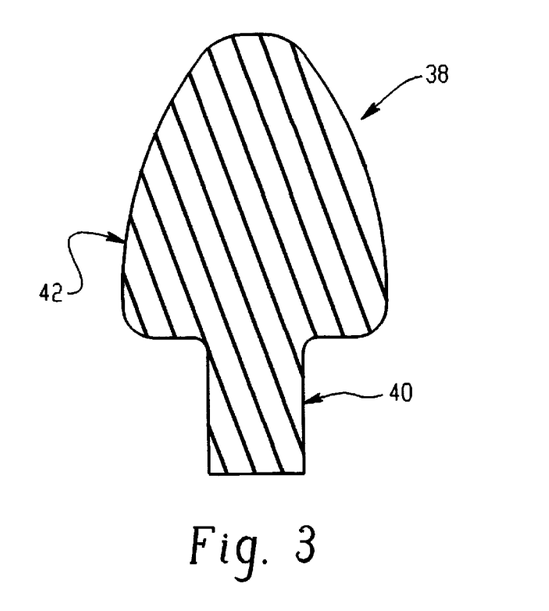
FIG. 3 is a greatly enlarged cross-sectional view through the gasket.

FIGS. 2 and 3 illustrate the preferred nominal dimensional relationships for the groove 30 and the gasket 38, respectively. In particular, the seal face of the flange has the general dimensions as shown for tubes having a nominal O.D. of 1.00 inches and an I.D. of 0.87 inches; however, the general relationships are valid for a range of tube sizes. In reviewing these dimensions and comparing the recess dimensions with the gasket dimensions, it will be seen that the narrower inner portion of the seal is compressed in the axial dimension by about 20–30% whereas the wider outer portion is compressed about 15–20%. This, of course, results in significantly higher sealing pressures between the rib 40 and the radial inner faces of the groove. Additionally, however, it will be seen that the wider portion of the gasket 38 is axially compressed until it moves to place the radial outer face of the gasket into compressive engagement with the radial outer face of the groove and form the secondary seal.

It will also be understood by those skilled in the art that the expansion spaces 44, 46 are not constrained to the configuration shown and described above. Any suitable dimensioning of the gasket and groove that permits the desired expansion can be used. Moreover, it is also contemplated that the gasket include void areas in the second portion of the gasket that can serve the same purpose. Thus, for example, notches can be formed at spaced circumferential locations of the gasket second portion or through openings in the gasket second portion can achieve this same objective.

Those skilled in the art will appreciate that the gasket 38 material will affect some of the functional aspects of the gasket. For example, when the gasket is made of an elastomeric material such as silicone rubbers and fluorocarbons, to name two examples, the enlarged cap 42 will be compressed as the assembly 14 is made up, to produce the radial compression and secondary seal at the extensions 16a and 18a. When the gasket 38 is made of a relatively harder material (although suitably soft to form the primary bore line seal at the faces 22, 24) such as polytetrafluoroethylene (PTFE), the enlarged cap 42 does not significantly extend radially so as to engage the extensions 16a and 18a. Thus, in the case of PTFE, for example, the cap 42 mushroom shaped appearance is ornamental, although an interference fit and enlarged mass is still used to maintain alignment during initial make-up. Materials such as PTFE have sufficient hoop strength to maintain the bore line seal at the intended pressures without the added support of the radial compression.

It should further be noted that in the described embodiment, such as FIG. 2 for example, the end faces 22, 24 that define the groove enlarged portion 34, engage the axial outer portions of the cap 42 before the rib 40 is engaged. This produces an initial compression on the cap 42 that supports and helps control radial extension of the rib as the rib is compressed when the fitting is made up.

With reference to FIGS. 7A–7E, there is illustrated in an exemplary manner different shapes and configurations of the gasket 38, in particular the cross-sectional shapes (in FIGS. 7A–7E only half of each cross-section of the gaskets 38 is illustrated). For example, in FIG. 7A, the radial taper in the gasket axial dimension is conical to form a flat edge 38a (when viewed in section). The exemplary shapes in FIGS. 7A–7E inclusive can include the interference fit and enlarged mass features vis-à-vis the packing groove 30 as described herein before. Furthermore, when the gaskets of FIGS. 7A–7E are made of an elastomer and with appropriate dimensions relative to the groove 30, they will be compressed and will extend radially to form the radial compression at the extensions 16a, 18a. These different embodiments are provided to emphasize that the shape and configuration of the gasket cap 42 is largely ornamental in terms of its appearance, and that the various desired functional aspects of the gasket 38 in accordance with the invention can be achieved with any number of configurations and shapes.

In accordance with another aspect of the invention, it will be appreciated from the foregoing descriptions that the gasket 38 can take on three radial dimensions at the rib inner annulus at different points in the make-up of the assembly 14. For example, when the gasket is free standing, not yet mounted on a flange, the inner diameter of the rib 40 will be dimension X, for example, with X being greater than the tube 10, 12 inside diameter. In other embodiments, the dimension X can be less than or equal to the tube inside diameter. When the gasket is pushed onto the counter bore 104 that forms the interface between the inner radial portion 32 and the radial outward portion 34 of the groove 30, the rib inner diameter will be dimension X+Y because of the interference fit. Thirdly, after the assembly 14 has been made up, the radial extension of the rib 40 caused by compression of the rib 40 will change the inner diameter of the rib 42 to be substantially equal to the tube 10, 12 inside diameter to provide the flush bore line seal. Again, in some applications, the compression on the rib 40 will be designed to produce a slight extrusion preferably convex in nature (see FIG. 1) into the tube inner diameter region to avoid a recess that could be difficult to clean in place. In all the drawings herein, some relative dimensions, such as for example the relative squeeze on the rib and cap or the illustrated amount of extrusion into the fluid path, have been exaggerated for clarity and ease of illustration.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A flange joint and gasket for joining and sealing tube or pipe ends that define an axial flow passage there through, comprising:

a first annular flange and a second annular flange, each of said flanges being at a respective one of the tube ends; said flanges having axially opposed end faces and adjacent radial end walls that define a circumferential groove when the joint is assembled;

said groove having a first portion open to the flow passage of the tubes and having a second portion that extends radially outward from said groove first portion, said groove second portion being radially bounded by said radial end walls; and a polymeric gasket to seal the assembled joint to prevent loss of fluid from the flow passage of the tubes, said gasket having a gasket first portion that seals said groove first portion and having a gasket second portion that extends from said gasket first portion and into said groove second portion;

said gasket first portion comprises a rib that is axially compressed when the joint is assembled, said rib when under compression in the assembled joint being radially displaced to form a subtatially flush bore line seal that is contiguous with interior surfaces of the tubes; and said gasket second portion being axially compressed when the joint is assembled and engaging with said radial end walls to produce a radial compression of said gasket; said gasket second portion having a volume that is less than volume of said groove second portion to provide an expansion space in said groove second portion when the joint is assembled.

2. The assembly of claim 1 wherein said radial compression opposes radial pressure from fluid in the flow passage to prevent radial displacement of said gasket.

3. The assembly of claim 2 wherein said radial compression effectively increases hoop strength of said gasket.

4. The assembly of claim 3 wherein said gasket second portion engaging said radial end walls forms a secondary seal that is radially aligned and spaced from said flush boreline seal formed by said gasket first portion.

5. The assembly of claim 1 wherein said gasket second portion has an outer edge face that radially is aligned with said gasket first portion.

6. The assembly of claim 1 wherein said gasket second portion is axially symmetric about a radial line that is common to said gasket first and second portions.

7. The assembly of claim 1 wherein said engagement between said gasket second portion and said radial end walls provides a barrier to prevent ingress of matter into said groove from outside the assembly.

8. The assembly of claim 1 wherein a radial distal portion of said gasket second portion comprises a crown that engages said radial end walls when the joint is assembled; said expansion space being adjacent and axially symmetric about said gasket radial distal portion; said expansion space permitting expansion of gasket material when said gasket is exposed to increased temperature.

9. The assembly of claim 1 wherein said gasket second portion is integral with said gasket first portion and is axially wider than said gasket first portion with a shoulder formed at the interface of said gasket first and second portions; said shoulder having an inner diameter that produces an interference fit at an interface between said groove first portion and said groove second portion; said groove second portion having an axial dimension that is greater than an axial dimension of said groove first portion.

10. The assembly of claim 9 wherein said interference fit permits said gasket to be centered and retained on one of said flanges during assembly of the joint.

11. The assembly of claim 10 wherein said gasket second portion when uncompressed has an axial dimension that is greater than said axial dimension of said groove second portion and has an enlarged mass to maintain a desired alignment of the flanges during assembly of the joint.

12. The assembly of claim 1 wherein said gasket has a mushroom-shaped cross-section.

13. The assembly of claim 1 wherein said gasket first portion comprises a rib with an inner annular surface, said rib annular surface having: a first diameter before the gasket is positioned on one of said flanges, a second diameter that is greater than said first diameter after the gasket is positioned on one of said flanges and before the gasket is compressed, and a third diameter after the joint is assembled with the gasket compressed.

14. The assembly of claim 1 wherein said radial end walls are formed by rigid radial outer extensions of said flanges that engage each other when the joint is assembled to limit axial movement of the flanges.

15. The assembly of claim 1 wherein said flanges include a capillary port that at a first end is in fluid communication with said expansion space and at a second end is accessible external the joint to permit sensing of characteristics of expansion space contents such as pressure characteristics.

16. The assembly of claim 1 wherein said gasket first portion is axially compressed in the range of about 20%–30% when the joint is assembled, and said gasket second portion is axially compressed in the range of about 15%–20%.

17. The assembly of claim 1 wherein said gasket comprises an elastomer.

18. A sealing gasket for insertion into a circumferentially continuous groove of a flange joint for joining axially aligned tube ends, the flange joint being of the type having axially opposed flanges at the tube ends to form a groove there between when the joint is assembled, the groove being formed by axially opposed seal faces and radial end faces of the flanges, the groove comprising a groove first portion that is open to an interior flow passage of said tubes and a groove second portion that extends radially outward from said groove first portion, with said groove second portion being radially bounded by radial end walls;

the gasket comprising:
a gasket first portion for sealing said groove first portion and a gasket second portion that extends from said gasket first portion and into said groove second portion; said gasket first portion comprises a rib that is axially compressed when the joint is assembled, said rib when under compression in the assembled joint being radially displaced to form a substantially flush bore line seal that is contiguous with interior surfaces of the tubes;

said gasket second portion being axially compressed when the joint is assembled and engaging with said radial end faces to produce a radial compression of said gasket; said gasket second portion having a volume that is less than volume of said groove second portion to form an expansion space in said groove second portion when the joint is assembled, wherein said gasket is comprised of a polymeric material.

19. The gasket of claim 18 wherein said radial compression of said gasket forms a secondary seal that is radially aligned and radially spaced from said gasket first portion seal.

20. The gasket of claim 18 wherein said radial compression opposes radial pressure from fluid in the flow passage to prevent radial displacement of said gasket.

21. The gasket of claim 18 wherein said radial compression effectively increases hoop strength of said gasket.

22. The gasket of claim 18 wherein said gasket second portion has a cross section that tapers axially in a radially outward direction from said gasket first portion.

23. The gasket of claim 22 wherein said expansion space is formed between the opposed flange faces and said gasket tapered cross section.

24. The gasket of claim 18 wherein said gasket comprises an elastomer material.

25. The gasket of claim 18 wherein said gasket has a symmetrical cross sectional shape.

26. The gasket of claim 18 wherein said radial compression of the gasket provides a barrier to atmosphere.

27. The gasket of claim 18 wherein the groove first portion is axially narrower than the groove second portion to form a shoulder at the radial interface thereof, said gasket being sized to have an interference fit with said shoulder to retain the gasket in position while the joint is assembled.

28. The gasket of claim 27 wherein said gasket second portion when uncompressed has an axial dimension that is greater than an axial dimension of said groove second portion and has sufficient mass to maintain a desired alignment of the flanges during assembly of the joint.

29. A method for sealing a flange joint of the type that uses two flanges to join axially aligned tube ends, the flanges when the joint is assembled forming a groove there between with the groove being defined by axially opposed seal faces and a radial end face, the method comprising the steps of:

positioning a polymeric gasket in a first and second portion of the groove between axially opposed seal faces of the flanges with said groove second portion being radially bounded by radial end walls;

compressing the gasket axially when the joint is assembled to displace a portion of the gasket that radially engages the radial end face;

axially compressing a rib of said gasket in a groove first portion so that said rib is radially displaced to form a substantially flush bore line seal that is contiguous with interior surfaces of the tubes;

compressing the gasket axially when the joint is assembled and engaging with said radial end walls sufficient to produce a radial compression of the gasket; and limiting compression of the gasket to maintain an expansion area for the gasket.

30. The method of claim 29 wherein said radial compression increases hoop strength of the gasket to oppose radial forces produced by fluid pressure in the tubes.

31. The method of claim 29 wherein said radial compression provides a secondary seal radially aligned and spaced from a primary seal at an interface of the tube ends.

32. The method of claim 29 comprising the step of using an interference fit between the gasket and the flanges to retain the gasket in a desired centered position during assembly of the joint.

33. The method of claim 32 comprising the step of providing sufficient mass to the gasket to use the gasket for maintaining a desired alignment of the flanges during assembly of the joint.

34. A flange joint and gasket for joining and sealing tube or pipe ends that define an axial flow passage there through, comprising:

a first annular final and a second annular flange, each of said flanges being at a respective one of the tube ends; said flanges having axially opposed end faces and adjacent radial end walls that define a circumferential groove when the joint is assembled;

said groove having a first portion open to the flow passage of the tubes and having a second portion that extends radially outward from said groove first portion, said groove second portion being radially bounded by said radial end walls; and     a gasket to seal the assembled joint to prevent loss of fluid from the flow passage of the tubes, said gasket having a gasket first portion that seals said groove first portion and having a gasket second portion that extends from said gasket first portion and into said groove second portion; wherein said gasket second portion is axially wider than said gasket first portion and has a cross-section that tapes radially outward from said gasket first portion;

said gasket second portion being axially compressed when the joint is assembled and engaging with said radial end walls to produce a radial compression of said gasket; said gasket second portion having a volume that is less than volume of said groove second portion to provide an expansion space in said groove second portion when the joint is assembled;

wherein said expansion space is formed between said axially opposed end faces, said radial end walls and said gasket tapered portion.

* * * * *

UNITED STATES PATENT AND TRADEMARK OFFICE
CERTIFICATE OF CORRECTION

PATENT NO. : 6,039,319
DATED : March 21, 2000
INVENTOR(S) : Coonce, et al.

It is certified that error appears in the above-identified patent and that said Letters Patent is hereby corrected as shown below:

Column 1, line 8, please delete "1991" and insert -- 1997--.

Signed and Sealed this

Thirteenth Day of February, 2001

Attest:

NICHOLAS P. GODICI

*Attesting Officer*   *Acting Director of the United States Patent and Trademark Office*